United States Patent [19]

Mouille

[11] Patent Number: 4,504,193
[45] Date of Patent: Mar. 12, 1985

[54] HELICOPTER ROTOR WITH ARTICULATION MEANS INTEGRATED IN THE ROOT OF THE BLADE

[75] Inventor: René L. Mouille, Aix-en-Provence, France

[73] Assignee: Societe Nationale Industrielle Aerospatiale, Paris, France

[21] Appl. No.: 423,401

[22] Filed: Sep. 24, 1982

[30] Foreign Application Priority Data

Nov. 25, 1981 [FR] France .................. 81 22027

[51] Int. Cl.³ .............................................. B64C 27/38
[52] U.S. Cl. .................................. 416/140; 416/134 A; 416/141
[58] Field of Search ................ 416/134 A, 138 A, 141, 416/140 A

[56] References Cited

U.S. PATENT DOCUMENTS

| 4,012,169 | 3/1977 | Mouille et al. | 416/134 A |
| 4,249,862 | 2/1981 | Waddington et al. | 416/141 X |
| 4,297,078 | 10/1981 | Martin | 416/140 A X |
| 4,304,525 | 12/1981 | Mouille | 416/134 A |
| 4,342,540 | 8/1982 | Lovera et al. | 416/141 X |
| 4,361,415 | 11/1982 | Aubry | 416/134 A |
| 4,369,019 | 1/1983 | Lovera et al. | 416/134 A |

FOREIGN PATENT DOCUMENTS

| 1531374 | 1/1970 | Fed. Rep. of Germany . | |
| 2282367 | 3/1976 | France . | |
| 2305343 | 10/1976 | France . | |
| 2427251 | 12/1979 | France . | |
| 2456034 | 12/1980 | France | 416/140 |

Primary Examiner—Everette A. Powell, Jr.
Attorney, Agent, or Firm—Karl W. Flocks; Sheridan Neimark; A. Fred Starobin

[57] ABSTRACT

The invention concerns a helicopter rotor, the rigid hub (1) of which comprises a central drum (2) which is disposed substantially in line with the rotor mast (3) and which carries an upper plate (4) and a lower plate (6). This rigid hub (1) is connected to the root of each blade (26) by way of a laminated spherical stop (13) and a resilient-return drag brace. Each blade (26) comprises, in the zone of its root, a rigid loop (27) which surrounds the laminated spherical stop (13) in a continuous manner and is engaged in the inner movable fitting (24) of this stop (13) by means of a wedge (30) co-operating with the outer fixed fitting (15) of the stop (13).

19 Claims, 6 Drawing Figures

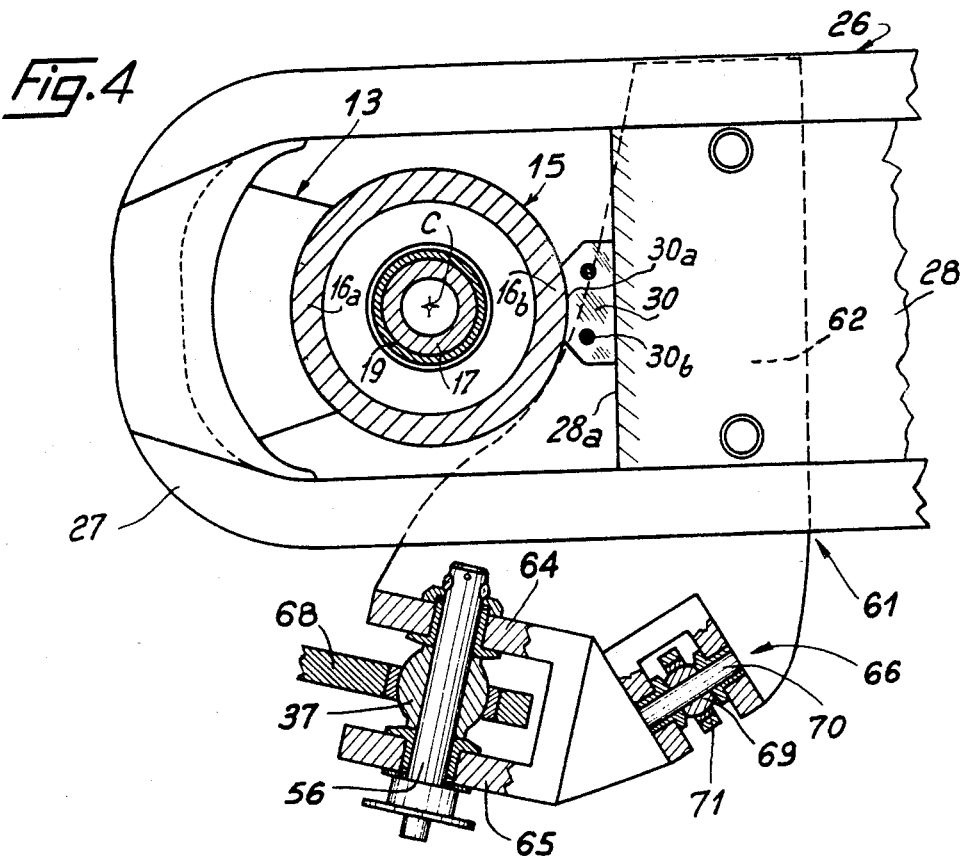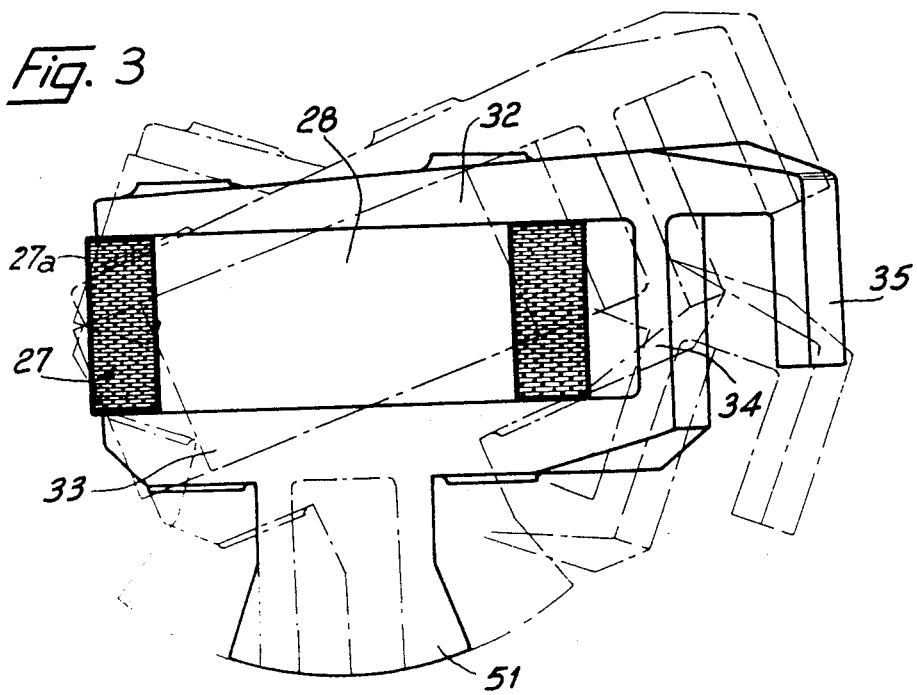

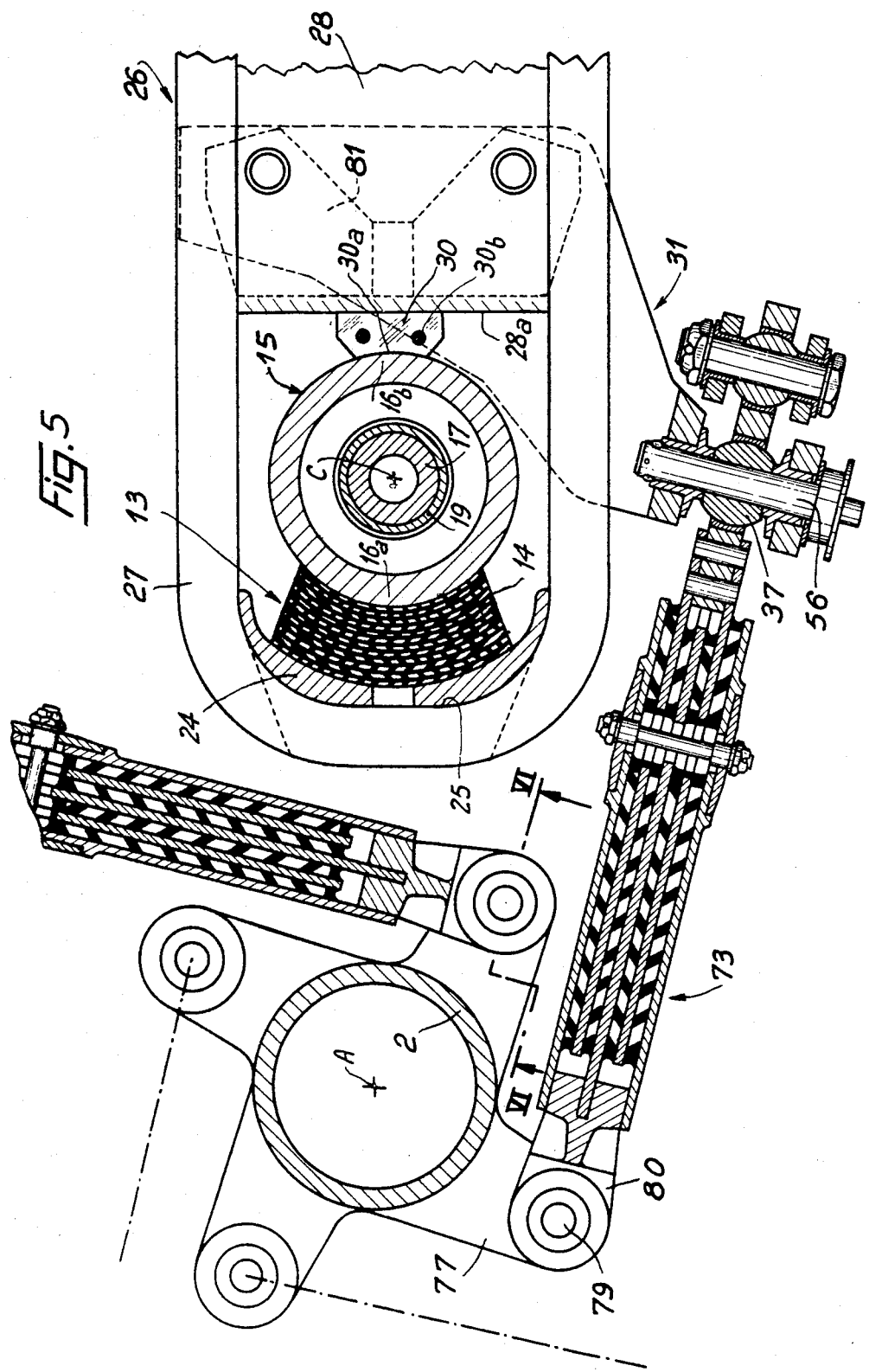

HELICOPTER ROTOR WITH ARTICULATION MEANS INTEGRATED IN THE ROOT OF THE BLADE

BACKGROUND OF THE INVENTION

The present invention concerns a helicopter rotor comprising a rigid hub, to which the base or root of each blade is connected by way of a spherical laminated stop and of a resilient-return drag brace, which is in the form of an elongate resilient-return element with integral damping means comprising elastomeric damping elements and forming a device commonly known as a frequency adaptor with integral damping means.

French Patent Application No. 7816521, filed on June 2nd, 1978 in the name of the present Applicants discloses a rotor of this kind, wherein the frequency adaptors with integral damping means are each constituted by a stack of metallic plates alternating with plates in a visco-elastic material having great powers of recovery from deformation, and are each connected, at their end remote from the hub, to the root of the corresponding blade by means of a ball-and-socket joint, and, at their inner end, to the hub so that the frequency adaptor is always slightly inclined to the corresponding blade, and so that the centre of one of the ball-and-socket joints is adjacent the flapping axis of the blade, which axis passes through the centre of the corresponding laminated spherical stop.

In the constructions of rotor which are described in the above-mentioned Patent Application, the peripheral portion of the hub, in the form of a flat ring of convex polygonal or substantially circular periphery, is traversed, in the direction of the axis of the rotor, by as many openings as there are blades, and each spherical laminated stop is fitted between the outer edge of the corresponding opening and the ends of the arms of a bifurcated element fixedly connected to the corresponding blade root. This bifurcated element is constituted either by an extension of the root of the corresponding blade, the ends of the arms of the bifurcated element being secured, for example by two bolts, to the support for the corresponding laminated spherical stop, or by a radial yoke, preferably a double yoke, the inner end of which, adjacent the hub, comprises two planar rigid plates arranged one on either side of the peripheral portion of the hub and spaced therefrom, and secured to the support for the corresponding laminated spherical stop, for example by two bolts, whereas the outer end of the radial yoke is secured to the root of the blade by two pins which are substantially at right angles to the plane of the rotor and one of which is removable to enable the corresponding blade to be "folded" in the plane of the rotor by being pivoted about the other pin.

Furthermore, in all of the forms of construction forming the subject matter of the above-mentioned Patent Application, the ball-and-socket joint, the centre of which is adjacent the flapping axis of the corresponding blade, constitutes the joint for connecting the corresponding frequency adaptor to the hub.

For the purpose of providing greater mechanical strength and of reducing the aerodynamic drag compared with that occurring with the forms of construction of the helicopter rotor in accordance with the above-mentioned Patent Application, other forms of construction which are more compact and are of simplified construction were described in an Application No. 7911585 for a first Patent of Addition, filed on May 8th, 1979.

In these forms of construction, the hub comprises a central drum which substantially forms an extension of the rotor mast and carries an upper plate and a lower plate, and one of the rigid elements of each laminated spherical stop is located between the edges of the two plates to form a crosspiece and is secured directly to these plates, whereas the other rigid element of the laminated spherical stop is connected to the root of the corresponding blade by a radial yoke, preferably a double yoke, and is recessed in that portion thereof that faces the hub, so as to permit free passage of the stop, the outer end of the corresponding frequency adaptor being connected to the yoke associated with this blade by a ball-and-socket joint the centre of which is adjacent the flapping axis of the corresponding blade.

Since the upper and lower plates of the rotor hub in these forms of construction are not recessed to receive the corresponding laminated spherical stops, and furthermore, since the edges of these plates are braced by one of the rigid elements of each of the stops, the plates of the hub offer an excellent mechanical resistance to the substantially radial tensile loads resulting from the action of the centrifugal force on the blades, as well as to the static and dynamic bending moments due to flap and drag which the blades apply to the members whereby they are connected to the hub.

However, the constructions forming the subject matter of Application No. 7911585 for a Patent of Addition like those described in Patent Application No. 7816521 wherein the bifurcated element connecting the laminated spherical stop to the blade is not formed by an extension of the root of the blade, suffer from the drawback of comprising a yoke, preferably a double yoke, interposed between the root of each blade and corresponding laminated spherical stop.

Such a yoke is generally formed by two rigid plates fixedly connected at their central zones by a cross-piece situated between them. The end portions of the rigid-plates remote from the hub accommodate, between them and with slight play, the root of the corresponding blade and carry at least two pins for securing the root of the blade to the yoke. The end portions of the rigid-plates nearer the hub, which are recessed for affording free passage to the laminated spherical stop in the arrangements disclosed in Application No. 7911585 for a Patent of Addition, are fixedly connected to the rigid element of the corresponding laminated spherical stop, which is not connected to the hub. The yoke is thus disadvantageous as regards weight and as regards radial congestion in the plane of the rotor and axial congestion in the direction of the axis of rotation of the rotor because of its presence and the fact that the roots of the blades are remote from the hub, and this has an unfavourable effect as regards aerodynamic drag of the rotor.

Furthermore, if, as is the case in the arrangement disclosed in the above-mentioned Application for a Patent of Addition, the cross-piece of the yoke is extended beyond the plates of the yoke, at the leading edge and/or the trailing edge of the corresponding blade, by a first and, possibly, a second angled attachment, shaped and arranged to receive the hinge-pin at one end of the lever for controlling the pitch of the blade and the ball-and-socket joint at the outer end of the corresponding frequency adaptor, then the yoke is of additionally complex structure and costly to produce.

SUMMARY OF THE INVENTION

The present invention seeks to provide rotors having a space-requirement, a weight and a cost of production that are reduced in comparison with those of the rotors described in the above-mentioned Patent of Addition, so as to reduce drag and to provide an economical rotor.

To this end, the rotor in accordance with the present invention, of the type wherein the rigid hub, comprising a central drum substantially as an extension of the rotor mast, and having an upper plate and a lower plate, is connected to the root of each blade by means of a laminated spherical stop and of a resilient return drag brace (preferably in the form of a frequency adaptor) constituted by a stack of rigid metallic or composite plates alternating with plates in a visco-elastic material of great powers of recovery from deformation, and having its inner and outer ends respectively connected by ball-and-socket joints to the hub and the root of the corresponding blade, the centre of the ball-and-socket joint at the outer end being adjacent the flapping axis of the blade, that passes through the centre of the corresponding laminated spherical stop, one of the rigid elements of which, fixed in relation to the plates of the hub, is disposed between the edges of the latter in the manner of a rigid cross-piece, is characterized in that each blade of the rotor has a resistant frame comprising, in the zone of the root of the blade, a rigid loop extending continuously round the corresponding laminated spherical stop and engaged in the other rigid element of this stop element which is movable relatively to the plates.

This rigid loop, constituted by an extension of the resistant frame of the blade which forms spar in the running portion of the latter and which is dimensioned to transmit the centrifugal tensile forces as well as the bending moments and the static and dynamic shear flap and drag forces, is formed by an agglomerate of rovings of resin-coated filaments.

It is of course known to form, in one or more adjacent loops in the zone of the root of the blade, rovings of filaments which help constitute a rotor blade, but this has been done to enable each of the loops to surround a bush designed to be traversed by a pin for securing the root of the blade to the mechanical elements of the hub, generally by means of a yoke.

As far as the present Applicants are aware, it has never been proposed to design the region of the root of the blade in such a way that it directly accommodates a laminated spherical stop, this enabling the blade to move freely about the centre of this stop without the need for any intermediate element.

Preferably, according to a preferred feature of the invention, the movable rigid element of the laminated spherical stop in which the rigid loop at the end of the corresponding blade is engaged, is formed by a fitting, the face of which opposite the axis of rotation of the rotor is in the form of a concave spherical cup, and the face of which presented to the axis of rotation of the rotor has a cavity for housing the rigid loop, whereas the fixed rigid element of the laminated spherical stop, which is fitted as a rigid cross-piece between the edges of the two plates, is constituted by a sleeve, the bore of which is traversed by a single pin for connecting the two plates, and the outer wall of which has two protuberances forming a preferably hollow spherical boss, centred on the longitudinal axis of the blade, one of these protuberances co-operating with a wedge for maintaining and blocking the rigid loop on the movable rigid element of the laminated stop.

Also, the two mutually facing portions of the rigid loop associated with the base of each blade are separated from each other by a block of filling material, preferably of laminated tissue or of loaded resin, of the type known as "compound", which, together with the portion of the rigid loop that passes continuously around the laminated spherical stop, provides a housing for the stop, the faces of the portion of the rigid loop accommodated in the cavity in the first fitting being provided with at least one layer of protective tissues made of high-strength fibres.

The rotor of the invention also comprises, for each blade, a pitch-control lever having a first bifurcated element, the limbs of which extend transversely, one above and the other below the root of the corresponding blade, to which root the lever is secured by bolts, as well as a second bifurcated element, the limbs of which carry a spindle, which is preferably removable to permit pivoting of the corresponding blade and on which is mounted a ball-and-socket joint for connection to the outer end of the corresponding resilient return brace. This outer end of the brace may also be connected to one end of a small rod for controlling the pitch of the corresponding blade, but it is also possible, according to the invention, for the pitch-control lever to have a third bifurcated element, the limbs of which carry a spindle, preferably removable for permitting pivoting of the corresponding blade and on which is mounted a ball-and-socket joint for connection to one end of a rod for controlling the pitch of the corresponding blade.

In the known manner, the ball-and-socket joint for connecting the inner end of each resilient return brace to the hub is attached by a nut and bolt system to an annular zone of the central tubular drum of the hub, the wall of which may have, at said tubular zone, either a portion of increased thickness traversed by the bolts, on the stems of which are mounted the corresponding ball-and-socket joints, or radial lugs on which said ball-and-socket joints are mounted.

It is also well-known that rotors of this kind comprise, below the edge of the lower plate and for each blade, a stop which, during flight, is retractable under the action of centrifugal force and which is arranged to co-operate with a bearing secured to the blade so as to limit the downward movements of the blade upon stoppage and when the rotor is turning at low speeds. However, according to the invention, the stop, which is retractable during flight, is preferably carried by the lower end of the single pin for connecting the root of the blade to the two plates associated with the hub, and the bearing co-operating with the retractable stop is preferably formed integrally with the lower limb of the first bifurcated element of the pitch-control lever.

Finally, as regards the form of the hub, it is possible for the central drum of the hub, together with which the upper plate forms a first one-piece metallic element, to be secured, for example by means of a ring of bolts, to the lower plate which itself constitutes, together with the upper portion of the rotor mast, a second one-piece metallic element. It is however possible for the central drum of the hub, which is fixedly connected to the upper plate, to be secured, again by means of a ring of bolts, to the lower plate, which is itself fixedly connected to the upper portion of the rotor mast.

The present invention will be better understood from the description given below by way of non-limiting examples of forms of construction illustrated in the drawings, in which:

BRIEF DESCRIPTION OF THE DRAWINGS

FIG. 3 is a view of a bifurcated element mounted on a blade of a rotor as shown in FIGS. 1 and 2, FIG. 4 is a partial view, similar to that of FIG. 2, in the case of a second form of construction of pitch-control lever, FIG. 5 is a view similar to that of FIG. 2 in the case of a second example of a rotor in accordance with the invention.

DETAILED DESCRIPTION OF THE INVENTION

Figure 1:
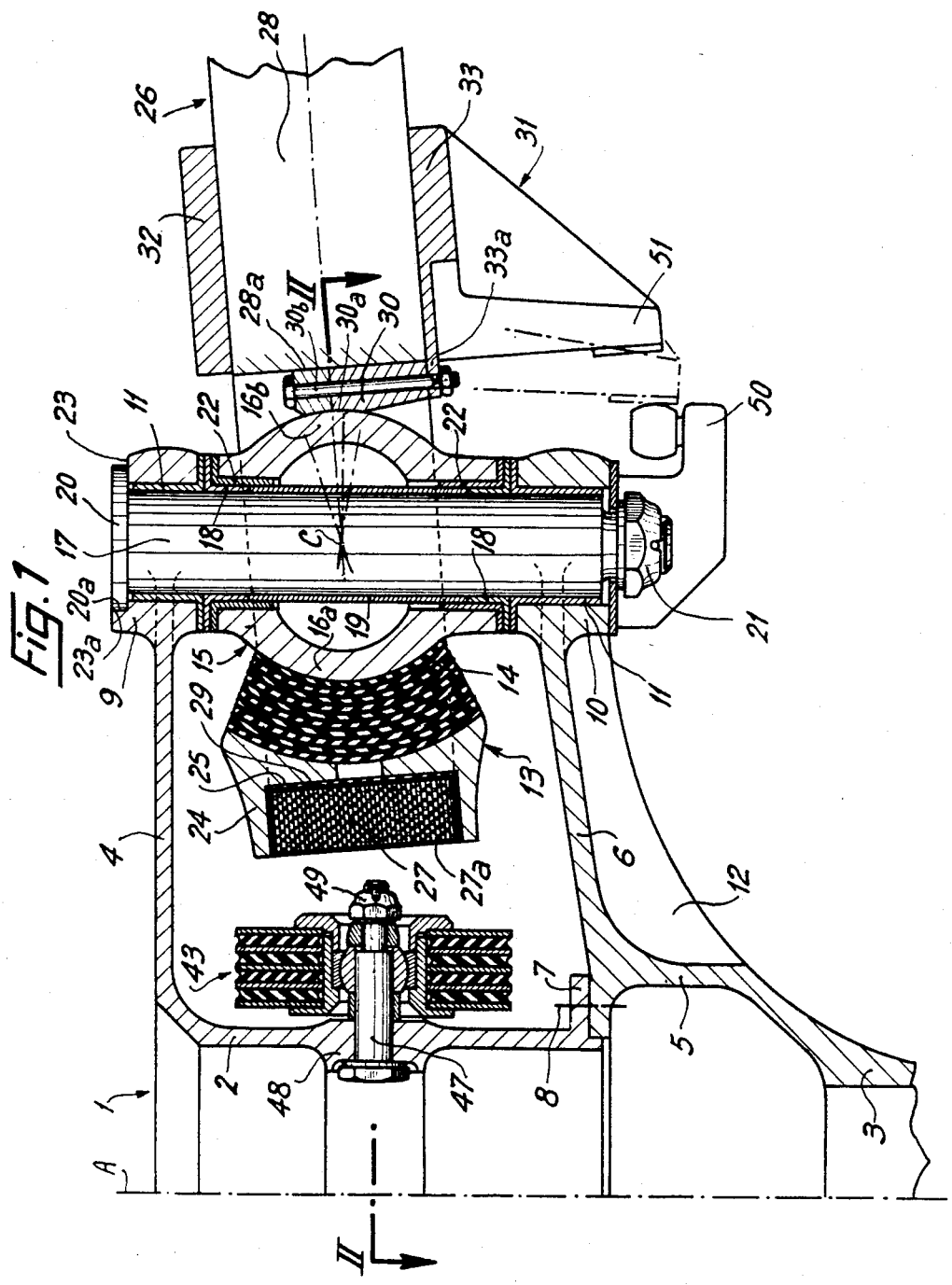
FIG. 1 is a partial sectional elevation through the median plane of a blade in a first example of rotor.
Figure 2:
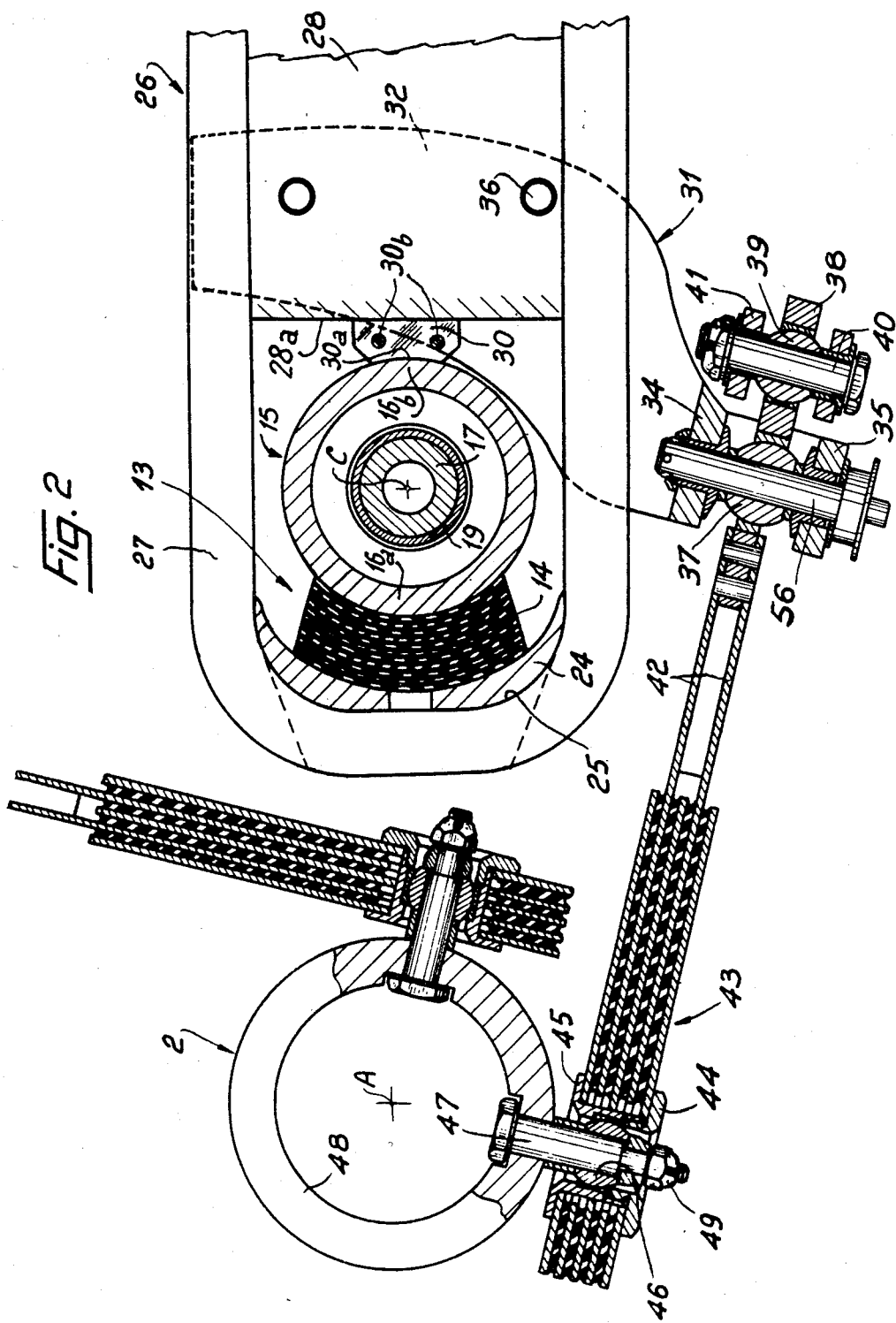
FIG. 2 is a partial sectional view on the line II—II of FIG. 1.

The main helicopter rotor, which is illustrated diagrammatically and in part in FIGS. 1 to 3, is of the four-bladed type. It comprises a rigid hub 1, the central portion of which is formed by a tubular central drum 2 of circular cross-section and having a diameter slightly greater than that of the mast 3 of the rotor driven about an axis A. At its top, the central drum 2 is integral with an upper plate 4 extending in a plane substantially at right angles to the axis of rotation A of the rotor. The upper portion 5 of the rotor mast 3 is integral with a lower plate 6 the inner edge of which is secured to an annular flange 7 formed at the exterior of the lower portion of the central drum 2 and attached, for example, by means of a ring of bolts indicated at 8. The upper plate 4 and the lower plate 6 are each substantially of the shape of a four-pointed star, the arrangement being such that the branches of the two plates 4 and 6 respectively have the same dimensions and are precisely disposed one above the other. As can be seen in FIG. 1, each of the plates 4 and 6 is of small thickness approximating to that of the wall of the tubular drum 2, and the ends of their arms provide hollow bosses 9, 10 respectively which are axially aligned and in which are mounted flanged bushes 11. The axes of the bushes 11 are substantially parallel to the axis of rotation A of the rotor mast 3 and, as can be seen from FIG. 1, the lower plate 6 is reinforced on its lower face by radial ribs 12 joined to the upper portion 5 of the rotor mast 3. The units formed by the rotor mast 3 and the lower plate 6 and by the central tubular drum 2 and the upper plate 4 are each formed by a single metallic part produced by die-stamping, for example.

A laminated spherical stop of a known type, designated as a whole by the numeral 13, is mounted between the ends of each pair of superposed arms of the two plates 4 and 6.

The laminated spherical stop 13, which simultaneously performs the role of articulation means of drag, flap and incidence (for controlling the pitch), carries out several functions: it takes up, with little deformation, the centrifugal forces and the radial forces applied to the blade to which it is connected, as explained above, and it permits the angular pitch movements, with a limited resilient return, as well as the flap and drag oscillations of the blade. The characteristics of flexibility under torsion and flap and the features of rigidity under axial and radial compression result from the sandwich structure of the central portion 14 of the stop 13 constituted by an arrangement of metallic or composite rigid part-spherical cups alternating with thin layers of elastomeric material which may be formed by mixtures based on natural rubber which have a good fatigue behaviour and excellent bonding qualities with metals, two fittings, one of which has a concave spherical surface and the other a convex spherical surface, being bonded by moulding to the central portion 14 of the laminated spherical stop 13.

In the embodiments illustrated, the fitting having the convex spherical surface is formed by a rigid one-piece metallic or composite sleeve 15, the outer wall of which has two protuberances 16a and 16b in the form of hollow spherical bosses centred on the longitudinal axis of the blade. The fitting is made, for example, of an aluminium or titanium alloy.

The sleeve 15 is located between the bosses 9 and 10 and is connected to them by way of a hollow metallic pin 17 which extends through the bushes 11 and through a unit carried by the sleeve 15 and consisting of two shouldered anti-friction rings 18 and a bush 19 bridging the gap between rings 18.

This pin 17 has a flat widened head 20, held against a complementary face 23 machined in the boss 9 of the upper plate 4 by tightening a nut 21 screwed and locked (for example by a peg) on the lower screw-threaded end of the pin 17 projecting below the boss 10 of the lower plate 6. The head 20 has a flat 20a which co-operates with an upstanding edge 23a adjoining the surface 23 so as to prevent the pin 17 from rotating about its own axis.

Disposed in the ends of the central bore of the sleeve 15 are anti-friction flanged rings 22, which are gripped with adjustable force in said sleeve. These rings 22 are of such size that their inside diameter provides slight play in relation to the outside diameter of the rings 18 and that the stack comprises the sleeve 15 and the two shoulders of the rings 22 likewise offer slight play in relation to the distance between the two inside faces of the shoulders of the rings 18.

This arrangement thus enables the blade 26 to be easily mounted on and removed from the hub 1 by means of a single pin 17, and if necessary, without removal of said pin 17, permits the sleeve 15 to be angularly pivoted about the axis of the pin 17 to permit "folding" of the corresponding blade 26.

The inner fitting 24 associated with the laminated spherical stop 13 and having a concave spherical surface is formed by a rigid metallic or composite block, the external shape of which is substantially that of a truncated pyramid, the base of which is hollowed to provide a concave spherical surface facing the spherical protuberance 16a on the sleeve 15, whilst in the smaller diameter portions of the block a slot 25 is formed which opens to the lateral faces of the block and which faces the central drum 2 of the hub 1.

In the embodiment illustrated, each blade 26 of the rotor comprises rovings of filaments, each roving being formed by an arrangement of basic wires, filaments or synthetic or mineral fibres of high mechanical strength, for example of glass, which are coated and agglomerated parallel to each other to form a bunch, by means of a hardened synthetic resin; in the zone of the root of the blade 26, these rovings of filaments form a continuous rigid loop 27 which continues into the running portion of the blade so as to form a high-strength spar at the leading edge, as well as elements at the trailing edge. These two facing portions of the loop 27 of rovings of filaments are separated from each other by a block 28 of a filler material of the type known as "compound". This block 28, together with the end portion of the loop 27 of rovings of filament, bound a free space forming a housing for the laminated spherical stop 13 which is surrounded by the loop 27 of rovings of filaments in an uninterrupted manner since they are lodged in the slot 25 of the block 24; the walls of the slot 25 are covered by a thin layer 29 of a flexible protective material. The end portion of the loop 27 of rovings of filaments, housed in the slot 25 of the fitting 24, is preferably coated over its surface with layers 27a of protective tissue made of high-strength fibres, for example, glass fibres.

Between the protuberance 16b on the sleeve 15 and the wall 28a of the filler block 28 facing the axis A of the rotor is arranged a two-part component 30 which provides a concave spherical bearing 30a located opposite the protuberance 16b. The component 30 is secured by two bolts 30b to a tongue 33a integral with a limb 33 of a bifurcated element of a pitch lever 31 described below.

This component 30, in the form of a wedge, constitutes a retention and blocking means for the loop 27 of rovings of filaments at the bottom of the slot 25, mainly during starting and/or stopping of the rotor, which may be accompanied by gusts of wind. The contact which is established between the protuberance 16b on the sleeve 15 and the wedge 30 prevents the loop 27 from inopportunely moving out of its seat in slot 25, and thus avoids any harmful effect which might result.

On the other hand, this arrangement facilitates the mounting of the blade 26 and relieves the laminated stop 13 of a part of the vertical shearing force due to the weight of the blade 26 when the latter is no longer subjected to the centrifugal force.

Since the inner fitting 24 of the laminated spherical stop 13 is surrounded by the loop 27 of rovings of filaments associated with the blade 26, the latter, the root of which accommodates the stop 13, can execute all the necessary movements about the centre of this stop 13, and the blade 26, for the purpose of its "folding", can also pivot about the single pin 17 which retains it on the hub 1 by means of the stop 13.

The rotor also comprises, for each blade 26, a pitch-control lever 31 which, as will be seen from FIG. 3, comprises, on the one hand, a first bifurcated element, the upper limb 32 and the lower limb 33 of which respectively extend transversely above and below two facing portions of the loop 27 of rovings of filaments and of the block 28 of filler material associated with the root of the blade 26 and, on the other hand, a second bifurcated element, one limb 34 of which connects to the two limbs 32 and 33 of the other bifurcated element, and the other limb 35 of which extends outside the first bifurcated element and is connected to the limb 34 by an extension of the upper limb 32 of the first bifurcated element. The pitch-control lever 31 is secured to the blade 26 by bolts 36 passing through the two limbs 32 and 33 of the first bifurcated element as well as the filler block 28. As can be seen from FIG. 2, a spindle 56 is removably mounted and turns on the two limbs 34 and 35 of the second bifurcated element by means of a pin and an anti-friction ring, and a ball-and-socket joint 37 is mounted on the spindle 56 and is connected by a plate 38 to a ball-and-socket joint 39 mounted on a removable pin 40 formed by a nut and screw arrangement connecting the two limbs of an end yoke of a pitch-control rod 41. The ball-and-socket joint 37 is also connected by the plate 38 to the outer end of two elongate parallel metallic plates 42, forming the outer end of an elongate resilient return element 43 incorporating damping means and also known as a resilient-return drag brace; this element is formed, in the well-known manner, by a stack of metallic or composite rigid plates alternating with plates of a visco-elastic material having great powers of recovery from deformation, such as a silicone elastomer. This brace 43, which enables the blades 26 to be rotated and to counter resiliently their drag oscillations in the plane of the rotor, also acts as an absorber of these oscillations, since, as is well known, these oscillations must be vigorously damped out to prevent them from coupling, in an unstable manner, with the resilient deformations of the helicopter airframe and from then giving rise to the dangerous divergent dynamic phenomenon known as "earth-resonance".

Near its inner end the brace 43 is partially traversed by two flanged cup elements 44 and 45, arranged in oppositely extending directions and forming, in the brace 43, a seat for accommodating a ball-and-socket joint 46, mounted on the shank of a bolt 47, which extends through an annular region 48 of the central tubular drum 2 of the hub 1, in which region the wall of the drum is thickened by an internal rib disposed substantially halfway along the drum 2. The head of the bolt 47 is retained within the tubular drum 2, and a nut 49 is screwed on and retained by a peg on the screw-threaded end of its shank. This screw and nut system is so positioned that the centre of the ball-and-socket joint 46, whereby the brace 43 of a blade 26 of the rotor is connected to the hub 1, is located substantially on the longitudinal axis of one of the two adjacent rotor blades 26. This ball-and-socket joint 46 is thus disposed in the space between the tubular drum 2 of the hub 1 and the outer wall of the loop 27 of rovings of filaments of this adjacent blade, in the spherical stop 13, whereas the centre of the ball-and-socket joint 37, whereby the brace 43 is connected to the pitch-control lever 31 of the corresponding blade 26, is located substantially on the flap-axis, of this blade 26.

As illustrated in FIG. 1, a stop 50, of a known type and retractable in flight under the action of centrifugal force, is fitted below the boss 10 on the lower plate 6. This retractable stop 50 is advantageously fitted at the lower end of the pin 17 and, when in operation, co-operates with a bearing 51 integral with the lower limb 33 of the first bifurcated element of the pitch-control lever 31 when the rotor is stopped or is turning at low speed, so as to limit downward pivoting of the blade 26 under its own weight.

When the rotor is caused to turn by way of the rotor mast 3, the driving couple is transmitted to each blade 26 by the associated brace, such as a brace 43, and when the rotor has reached its normal speed of rotation, the system of centrifugal forces applied to the various elements of each blade 26, subjects the corresponding laminated spherical stop 13 to a radial resultant force which is jolted by the compression of the central portion 14 of this stop 13. On the other hand, under the action of the various dynamic and inertia moments and forces that act upon each blade, the latter takes up a flap position of equilibrium about the centre C of the laminated spherical stop 13, due to deformation of the central portion 14 in shear.

With the rotor running in the normal manner when the helicopter is in translatory flight, the drag oscillations of each blade, such as the blade 26, are to a large extent absorbed by the corresponding resilient-return brace 43. Since, furthermore, the ball-and-socket joint 37 by which the outer end of the brace is connected to the root of the blade 26 by way of the pitch-control lever 31, is near the flap axis of the blade 26 passing through the centre C of the stop 13, the flap movements of this blade give rise only to negligible compression or tensile forces applied to this brace 43; thus, the latter superposes only negligible resilient-return and damping actions on these flap movements of the blade. The same applies as regards displacements that are substantially at right angles to the end of the pitch-control rod 41, since these displacements are likewise transmitted to the pitch-control lever 31 by way of this same ball-and-socket joint 37. On the other hand, since the stops, such as the stop 50, are then retracted by the effect of the centrifugal force, the flap movements of the blades, corresponding to their normal operation, are no longer limited in the downward direction.

When the rotor comes to a stop, the brace 43 associated with each blade 26 resumes its length and shape by applying, to the root of the corresponding blade 26, a return force which brings the blade into its neutral position; the downward flexing of the blades is then again limited by the stops, such as the stop 50, which resume the position in which they co-operate with the corresponding bearing 51, when the speed of rotation of the rotor has dropped below a predetermined value.

The various positions of the pitch-control lever 31 and therefore of the root of the corresponding blade 26, under the effect of the substantially vertical displacements of the pitch-control rod 41, that cause rotation of the lever 31 and a change in the incidence of the blade 26, are illustrated by dash-dot lines in FIG. 3.

The modified form of rotor illustrated in part in FIG. 4, differs from that shown in FIGS. 1 to 3 only as regards the construction of the pitch-control lever 61 which has not only a first and second bifurcated element similar to those of the pitch-control lever 31, but also a third bifurcated element 66, connected like the second element, to the upper limb 62 of the first bifurcated element. The limbs of element 66 support a removable pin 70, on which is mounted a ball-and-socket joint 69 for connecting to the pitch rod 71, whereas the limbs 64 and 65 of the second bifurcated element accommodate the removable pin 56 carrying the ball-and-socket joint 37 for connection to the outer end of the corresponding brace by way of the connecting plate 68.

Figure 6:
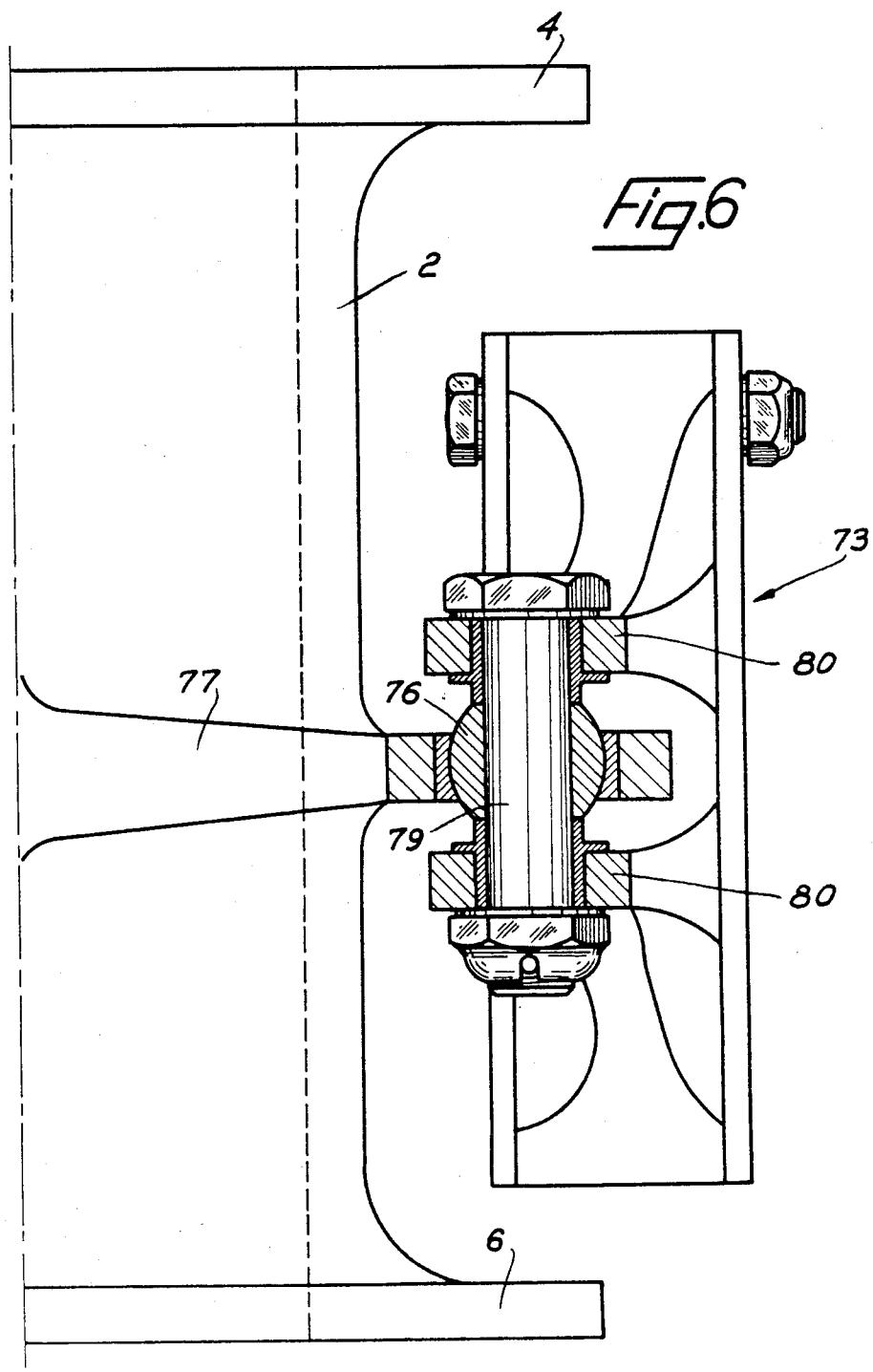
FIG. 6 is a partial sectional view along the line VI—VI of FIG. 5.

FIGS. 5 and 6 illustrate a modified form of the rotor shown in FIGS. 1 to 3 differing from the latter mainly as regards connection of the inner end of the brace 73 to the central tubular drum 2. The latter, in fact, has, roughly half-way along its vertical dimension, outwardly projecting and substantially radially-extending lugs 77, on which are mounted ball-and-socket joints 76 for connection to the inner end of the brace 73, the outer end of which is connected to the pitch-control lever 31 by the ball-and-socket joint 37 as explained in connection with FIGS. 1 to 3. The ball-and-socket joint 76 is mounted on a removable pin 79 formed by a bolt and nut unit and passing through flanges 80 for attachment to the inner end of the brace 73 consisting of a stack of metallic or composite rigid plates alternating with plates made of a visco-elastic material having great powers of recovery from deformation.

FIG. 5 also shows, in broken lines, a bearing 81 which co-operates with a bottom stop, retractable during flight, such as the stop 50 illustrated in FIG. 1.

In the forms of construction of the four-bladed rotor that are illustrated in FIGS. 1, 2, 5 and 6, "folding" of the rotor blades 26 is achieved by pivoting two blades forwardly and two blades rearwardly about the pin 17 for connecting the blades to the hub.

To enable these pivoting movements to be carried out, it suffices to disconnect the pitch-control rods and the resilient-return braces from the pitch-control lever connected to the root of the blade by retracting the removable spindles provided for this purpose.

The present invention is not limited to the forms of construction that have been described. It covers all modified forms thereof, particularly as regards the form of the hub. The form of construction of the bottom retractable stops, such as the stop 50, is a matter of choice as are the shape and construction of the resilient-return drag braces.

It should be noted that the shape of the pitch-control levers 31 and 61, which is angled as seen in plan view, permits efficient positioning of the ball-and-socket joint for connecting the outer end of the brace in the vicinity of the flap-axis of the corresponding blade.

In addition to the advantages aimed at, which are the lightness and small space-requirements of the hub of the rotor and its low production cost, it will be clear that the rotors described and illustrated require little maintenance and overhaul and are "fail-safe".

Finally, when used as part of the equipment of light-weight helicopters in particular, a rotor in accordance with the invention, provided with metallic blades of small dimensions, is such that, for each blade, the rigid loop can be formed by a flange solidly connected to the blade socket or even machined in an extension of the spar or spars forming part of the high-strength frame of the blade.

I claim:

1. A helicopter rotor comprising:
   at least two blades, each of which having a resistant frame extending to a corresponding blade root end,
   a rigid hub having
   a central drum secured to a top part of a rotor mast and coaxial therewith, said rotor mast rotating about a rotor rotating axis,
   an upper plate and a lower plate rigid with said central drum and extending substantailly outwards from said drum, said upper and lower plates being axially spaced with one another along said drum,
   each said blade being connected by its blade root end to said hub by means of
   articulation means consisting in a single laminated spherical stop having a central portion of sandwich structure constituted by an arrangement of rigid part-spherical cups alternating with layers of elastomeric material,
   a rigid radial outer fitting having a convex part-spherical surface turned towards said drum and by which it is bonded to said central portion, said outer fitting being fixed to said upper and lower plates and extending between said plates as a rigid cross-piece, and
   a rigid radial inner fitting having a concave part-spherical surface turned opposite said drum and by which it is bonded to said central portion, said inner fitting having a slot in its face turned towards said drum, said root end being also connected to said hub by means of a resilient-return drag brace having an inner and an outer end connected by ball and socket joints respectively to said hub and to said root end, the center of the ball and socket joint at said outer brace end being adjacent to the flap axis of the corresponding blade that passes through the center of said laminated spherical stop, wherein said root end comprises a rigid loop integral with said resistant frame of the corresponding blade, said rigid loop extending between said upper and lower plates and continuously round the corresponding laminated spherical stop, and being engaged and retained in said slot of said spherical stop inner fitting.

2. A rotor as in claim 1, wherein said outer fitting of each said spherical stop is constituted by a sleeve having a bore traversed by a single pin for connecting said upper and lower plates, and around which pin the corresponding blade can be pivoted, said sleeve having an outer wall presenting a first spherical protuberance centered on the longitudinal axis of said corresponding blade, and the outer surface of which constitutes said convex part-spherical surface of said outer fitting.

3. A rotor as in claim 2, wherein said rigid loop of each blade has a first portion, surrounding the corresponding laminated spherical stop and engaged in said slot of said spherical stop, and two mutually facing portions which are separated from each other by a block of a filler material which together with said first portion of said loop forms a housing for said spherical top.

4. A rotor as in claim 3, wherein said sleeve outer wall presents a second spherical protuberance opposite to said first protuberance and also centered on said longitudinal axis of said corresponding blade, the rotor further comprising a device for retaining and blocking said rigid loop in said corresponding slot, said device being formed by a wedge-shaped element fitted between, said second spherical protuberance and a wall of said filler material block facing said rotation axis, said wedge-shaped element having a concave spherical portion which faces siad second protuberance and being secured to said corresponding blade.

5. A rotor as in claim 1, wherein said resistant frame of each blade comprises an agglomerate of rovings which form said rigid loop of said blade.

6. A rotor as in claim 1, wherein at least a thin layer of a flexible protective material covers the walls of said slot and is interposed between said slot walls and a portion of said rigid loop which is engaged in said slot.

7. A rotor as in claim 1, wherein said rigid loop has a portion engaged in said slot and having faces covered with at least one layer of protective tissue made of high-strength fibers.

8. A rotor as in claim 1, wherein each said drag-brace is in the form of a frequency adaptor comprising a stack of rigid plates alternating with plates in a visco-elastic material having a great power of recovery from deformation.

9. A rotor as in claim 2, wherein said pin extends through holes formed opposite each other in superposed parts adjacent the edges of said upper and lower plates, each said hole accommodating a flanged bush, said pin having a widened retaining head held against a face machined in the upper surface of said upper plate, said retaining head having a flat cooperating with an upstanding edge of said mechined face for preventing any rotation of said pin.

10. A rotor as in claim 2, wherein said sleeve bore accommodates on one hand a unit comprising two anti-friction shouldered rings interconnected by a central bush, and on the other hand, at the ends of said bore and between the wall of the latter and said shouldered rings, two anti-friction flanged rings gripped with adjustable force in said sleeve and having an inside diameter slightly less than the outside diameter of said shouldered rings, said sleeve and the flanges of said flanged rings forming a stacked arrangement having a slight clearance relative to the distance between the inner faces of the shoulders of said shouldered rings.

11. A rotor as in claim 4, wherein said wedge-shaped element is carried by a pitch-control lever fixed to said corresponding blade.

12. A rotor as in claim 11, wherein each pitch-control lever has a first bifurcated element, the limbs of which extend transversely, one above and one below said corresponding blade, to which said lever is secured by bolts, and a second bifurcated element, the limbs of which carry a first removable spindle for pivoting said corresponding blade, and on which first spindle said corresponding ball-and-socket joint is mounted for connection to said outer end of the corresponding resilient-return brace.

13. A rotor as in claim 12, wherein said outer end of said corresponding resilient-return brace is also connected by way of a further ball-and-socket joint to one end of a rod for controlling the pitch of said corresponding blade.

14. A rotor as in claim 12, wherein said pitch-control lever has a third bifurcated element, the limbs of which carry a second removable spindle for pivoting the corresponding blade on which second spindle, a further ball-and-socket joint is mounted for the connection at one end, of a rod for controlling the pitch of said corresponding blade.

15. A rotor as in claim 1, wherein said ball-and-socket joint for connection of the inner end of each resilient-return brace to the hub is attached, by a screw and nut system, to an annular zone of said central drum which is tubular.

16. A rotor as in claim 15, wherein the wall of said tubular central drum, has, at said annular zone, a thickened portion traversed by bolts, on the shanks of which are mounted said ball-and-socket units at said inner ends of said braces.

17. A rotor as in claim 15, wherein the wall of said tubular drum has, at said annular zone, substantially radial lugs, on which are mounted said ball-and-socket joints associated with said inner ends of said braces.

18. A rotor as in claim 14, wherein the center of said ball-and-socket joint associated with said inner end of said brace of each blade is substantailly on the longitudinal axis of one of the blades adjacent the corresponding blade.

19. A rotor as in claim 2, wherein it further comprises, below said lower plate and for each blade, a stop which is retractable during flight under the action of centrifugal force which is carried by the lower end of said pin and which is so arranged as to cooperate with a bearing solidly connected to said blade so as to limit downward flap movements of said blade when the rotor stops or is turning at low speeds.

* * * * *